S008558978B2

United States Patent
Chen et al.

(10) Patent No.: US 8,558,978 B2
(45) Date of Patent: Oct. 15, 2013

(54) LCD PANEL WITH INDEX-MATCHING PASSIVATION LAYERS

(75) Inventors: Cheng Chen, Cupertino, CA (US); Mingxia Gu, Santa Clara, CA (US); Shih Chang Chang, Cupertino, CA (US); John Z. Zhong, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1023 days.

(21) Appl. No.: 12/371,368

(22) Filed: Feb. 13, 2009

(65) Prior Publication Data

US 2010/0208158 A1 Aug. 19, 2010

(51) Int. Cl.
*G02F 1/1333* (2006.01)
*G02F 1/1343* (2006.01)

(52) U.S. Cl.
USPC ............................ 349/138; 349/139; 349/141

(58) Field of Classification Search
USPC .......................................... 349/138–139, 141
See application file for complete search history.

(56) References Cited

U.S. PATENT DOCUMENTS

| | | | |
|---|---|---|---|
| 4,991,115 A | 2/1991 | Guthrie et al. | |
| 5,396,351 A | 3/1995 | Gessel | |
| 5,450,222 A | 9/1995 | Sirkin | |
| 5,610,082 A * | 3/1997 | Oh ................................ | 438/160 |
| 5,659,378 A | 8/1997 | Gessel | |
| 6,157,426 A | 12/2000 | Gu | |
| 6,285,431 B2 | 9/2001 | Lyu | |
| 6,433,933 B1 | 8/2002 | Gettemy | |
| 6,466,285 B1 | 10/2002 | Ichikawa | |
| 6,466,290 B2 | 10/2002 | Kim | |
| 6,536,933 B1 | 3/2003 | Gettemy et al. | |
| 6,545,862 B1 | 4/2003 | Gettemy et al. | |
| 6,603,469 B1 | 8/2003 | Gettemy et al. | |
| 6,618,044 B1 | 9/2003 | Gettemy et al. | |
| 6,642,985 B2 | 11/2003 | Kim | |
| 6,685,328 B1 | 2/2004 | Hanson et al. | |
| 6,700,560 B2 | 3/2004 | Sumiya | |
| 6,710,754 B2 | 3/2004 | Oliver et al. | |
| 6,718,115 B1 | 4/2004 | Gettemy et al. | |
| 6,741,314 B2 | 5/2004 | Song | |
| 6,859,244 B2 | 2/2005 | Kawase et al. | |
| 6,888,532 B2 | 5/2005 | Wong et al. | |
| 6,919,681 B2 | 7/2005 | Cok | |
| 6,924,752 B2 | 8/2005 | Gettemy et al. | |
| 6,924,863 B2 | 8/2005 | Nishida | |

(Continued)

FOREIGN PATENT DOCUMENTS

| | | |
|---|---|---|
| JP | 2001092382 | 4/2001 |
| KR | 20040061426 | 7/2004 |
| WO | WO 2008077261 | 7/2008 |

OTHER PUBLICATIONS

U.S. Appl. No. 12/371,284, filed Feb. 13, 2009, Chang et al.

(Continued)

*Primary Examiner* — Lauren Nguyen
(74) *Attorney, Agent, or Firm* — Fletcher & Yoder PC

(57) ABSTRACT

A liquid crystal display (LCD) having one or more index-matching layers is provided. In one embodiment, an index-matching passivation layer is provided between two additional layers of the LCD. The index-matching passivation layer may include a refractive index greater than a first layer of the two additional layers and less than a second layer of the two additional layers. Various additional devices and methods are also provided.

14 Claims, 8 Drawing Sheets

(56) References Cited

U.S. PATENT DOCUMENTS

| | | |
|---|---|---|
| 6,947,017 B1 | 9/2005 | Gettemy |
| 6,965,375 B1 | 11/2005 | Gettemy et al. |
| 6,992,659 B2 | 1/2006 | Gettemy |
| 7,002,569 B1 | 2/2006 | Gettemy et al. |
| 7,006,080 B2 | 2/2006 | Gettemy |
| 7,034,802 B1 | 4/2006 | Gettemy et al. |
| 7,048,401 B2 | 5/2006 | Lee et al. |
| 7,057,579 B2 | 6/2006 | Hanson et al. |
| 7,057,698 B2 | 6/2006 | Chung |
| 7,068,256 B1 | 6/2006 | Gettemy et al. |
| 7,079,119 B2 | 7/2006 | Hanson et al. |
| 7,091,964 B2 | 8/2006 | Wong et al. |
| 7,095,387 B2 | 8/2006 | Lee et al. |
| 7,159,194 B2 | 1/2007 | Wong et al. |
| 7,167,309 B2 | 1/2007 | Saxena |
| 7,203,075 B2 | 4/2007 | Terada et al. |
| 7,248,271 B2 | 7/2007 | Credelle |
| 7,248,320 B2 | 7/2007 | Hirakata |
| 7,256,767 B2 | 8/2007 | Wong et al. |
| 7,268,775 B1 | 9/2007 | Gettemy |
| 7,304,707 B2 | 12/2007 | Son |
| 7,324,093 B1 | 1/2008 | Gettemy et al. |
| 7,339,639 B2 | 3/2008 | Nakano et al. |
| 7,342,571 B2 | 3/2008 | Fraser et al. |
| 7,348,964 B1 | 3/2008 | Gettemy et al. |
| 7,349,052 B2 | 3/2008 | Wu et al. |
| 7,362,338 B1 | 4/2008 | Gettemy et al. |
| 7,379,143 B2 | 5/2008 | Lyu |
| 7,466,373 B2 | 12/2008 | Xu et al. |
| 7,483,016 B1 | 1/2009 | Gettemy et al. |
| 2003/0098857 A1 | 5/2003 | Gettemy et al. |
| 2003/0160755 A1 | 8/2003 | Gettemy et al. |
| 2004/0046739 A1 | 3/2004 | Gettemy |
| 2004/0085503 A1 | 5/2004 | Kim |
| 2005/0030454 A1* | 2/2005 | Jang et al. .................... 349/114 |
| 2005/0139837 A1 | 6/2005 | Lee |
| 2005/0184974 A1 | 8/2005 | Gettemy et al. |
| 2005/0212999 A1 | 9/2005 | Yang |
| 2005/0269580 A1 | 12/2005 | D'Angelo |
| 2006/0018175 A1 | 1/2006 | Liljedahl |
| 2006/0066805 A1 | 3/2006 | Grunnet-Jepsen |
| 2006/0197740 A1 | 9/2006 | Xu et al. |
| 2006/0203169 A1 | 9/2006 | Ozawa |
| 2006/0232553 A1 | 10/2006 | Wong et al. |
| 2006/0256264 A1 | 11/2006 | Yang |
| 2006/0268560 A1 | 11/2006 | Wong et al. |
| 2006/0279557 A1 | 12/2006 | Gettemy |
| 2006/0284895 A1 | 12/2006 | Marcu et al. |
| 2007/0024583 A1 | 2/2007 | Gettemy et al. |
| 2007/0052617 A1 | 3/2007 | Hanson et al. |
| 2007/0069975 A1 | 3/2007 | Gettemy et al. |
| 2007/0070272 A1 | 3/2007 | Gettemy et al. |
| 2007/0070282 A1 | 3/2007 | Shibahara |
| 2007/0115417 A1 | 5/2007 | Ge et al. |
| 2007/0139586 A1 | 6/2007 | Gu et al. |
| 2007/0152963 A1 | 7/2007 | Wong et al. |
| 2007/0222927 A1 | 9/2007 | Uehara |
| 2007/0229475 A1 | 10/2007 | Gettemy et al. |
| 2007/0229749 A1 | 10/2007 | Kaneko |
| 2007/0258020 A1* | 11/2007 | Nagata et al. .................... 349/43 |
| 2007/0273714 A1 | 11/2007 | Hodge et al. |
| 2007/0290989 A1 | 12/2007 | Gettemy et al. |
| 2007/0296693 A1 | 12/2007 | Wong et al. |
| 2008/0018816 A1* | 1/2008 | Hattori et al. .................... 349/39 |
| 2008/0032755 A1 | 2/2008 | Fraser et al. |
| 2008/0036948 A1 | 2/2008 | Zhong et al. |
| 2008/0062139 A1 | 3/2008 | Hotelling et al. |
| 2008/0062140 A1 | 3/2008 | Hotelling et al. |
| 2008/0062147 A1 | 3/2008 | Hotelling et al. |
| 2008/0062148 A1 | 3/2008 | Hotelling et al. |
| 2008/0068549 A1 | 3/2008 | Liao |
| 2008/0074400 A1 | 3/2008 | Gettemy et al. |
| 2008/0083569 A1 | 4/2008 | Gettemy et al. |
| 2008/0117184 A1 | 5/2008 | Gettemy |
| 2008/0121898 A1 | 5/2008 | Yin et al. |
| 2008/0137018 A1 | 6/2008 | Lin |
| 2008/0143946 A1 | 6/2008 | Wang |
| 2008/0164056 A1 | 7/2008 | Gettemy et al. |
| 2008/0180801 A1 | 7/2008 | Kobayashi |
| 2008/0186440 A1 | 8/2008 | Lim |
| 2008/0204431 A1 | 8/2008 | Chung et al. |
| 2008/0225217 A1 | 9/2008 | Wakabayashi |
| 2008/0231959 A1 | 9/2008 | Grip |
| 2008/0238813 A1 | 10/2008 | Gettemy et al. |
| 2008/0246726 A1 | 10/2008 | Gettemy |
| 2008/0259254 A1 | 10/2008 | Kikuchi |
| 2008/0303998 A1 | 12/2008 | Ohta |
| 2008/0309627 A1 | 12/2008 | Hotelling et al. |
| 2008/0309633 A1 | 12/2008 | Hotelling et al. |
| 2009/0009442 A1 | 1/2009 | Galbraith, Jr. et al. |

OTHER PUBLICATIONS

U.S. Appl. No. 12/371,316, filed Feb. 13, 2009, Chang et al.
U.S. Appl. No. 12/371,342, filed Feb. 13, 2009, Chen et al.
U.S. Appl. No. 12/371,360, filed Feb. 13, 2009, Gu et al.
U.S. Appl. No. 12/371,364, filed Feb. 13, 2009, Chen et al.
U.S. Appl. No. 12/371,380, filed Feb. 13, 2009, Chen et al.
U.S. Appl. No. 12/371,409, filed Feb. 13, 2009, Xu et al.
U.S. Appl. No. 12/371,452, filed Feb. 13, 2009, Chang et al.
U.S. Appl. No. 12/415,848, filed Mar. 31, 2009, Chen et al.
U.S. Appl. No. 12/236,066, filed Sep. 23, 2008, Gettemy et al.
Jung, Byunghoo, et al.; "Improved Aperture Ratio Through Asymmetric Pixel Electrode Design"; Feb. 13, 1997.

* cited by examiner

LCD PANEL WITH INDEX-MATCHING PASSIVATION LAYERS

BACKGROUND

1. Field of the Invention

This relates generally to electronic display panels, such as liquid crystal displays.

2. Description of the Related Art

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Liquid crystal displays (LCDs) are commonly used as screens or displays for a wide variety of electronic devices, including such consumer electronics as televisions, computers, and handheld devices (e.g., cellular telephones, audio and video players, gaming systems, and so forth). Such LCD devices typically provide a flat display in a relatively thin package that is suitable for use in a variety of electronic goods. In addition, such LCD devices typically use less power than comparable display technologies, making them suitable for use in battery-powered devices or in other contexts where it is desirable to minimize power usage.

The performance of an LCD may be measured with respect to a variety of factors. For example, the brightness of the display, the visibility of the display when viewed at an angle, the refresh rate of the display, and various other factors may all describe an LCD and/or determine whether a display will be useful in the context of a given device. With respect to brightness, it is noted that the perceived brightness of an LCD is influenced by a number of factors. For example, an LCD panel typically includes a number of transparent layers through which light passes, and that these layers may have different refractive indices. As light passes between the various materials of these layers, some of the light may be reflected at interfaces between the materials, thus reducing the amount of light that passes completely through the LCD panel and is output to a user.

SUMMARY

Certain aspects of embodiments disclosed herein by way of example are summarized below. It should be understood that these aspects are presented merely to provide the reader with a brief summary of certain forms an invention disclosed and/or claimed herein might take, and that these aspects are not intended to limit the scope of any invention disclosed and/or claimed herein. Indeed, any invention disclosed and/or claimed herein may encompass a variety of aspects that may not be set forth below.

The present disclosure relates to increasing the light transmission of electronic display pixels and panels. In accordance with the present disclosure, a display panel may include one or more intermediate index-matching layers interposed between other layers of the display panel having different refractive indices. More particularly, such an index-matching layer may have a refractive index between those of other adjacent layers, and may reduce the degree to which light is reflected as light passes through the display panel, such as an LCD panel. Moreover, by reducing the amount of light internally reflected by the display panel, the amount of light ultimately output from the display panel, such as to a user, is increased. While an index-matching layer may have any refractive index between those of other adjacent and opposing layers, in one embodiment the refractive index of the index-matching layer may be approximately equal to the square root of the product of the refractive indices of the adjoining layers.

Various refinements of the features noted above may exist in relation to various aspects of the present invention. Further features may also be incorporated in these various aspects as well. These refinements and additional features may exist individually or in any combination. For instance, various features discussed below in relation to one or more of the illustrated embodiments may be incorporated into any of the above-described aspects of the present invention alone or in any combination. Again, the brief summary presented above is intended only to familiarize the reader with certain aspects and contexts of embodiments of the present invention without limitation to the claimed subject matter.

BRIEF DESCRIPTION OF THE DRAWINGS

Advantages of the invention may become apparent upon reading the following detailed description and upon reference to the drawings in which.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Moreover, while the term "exemplary" may be used herein in connection to certain examples of aspects or embodiments of the presently disclosed subject matter, it will be appreciated that these examples are illustrative in nature and that the term "exemplary" is not used herein to denote any preference or requirement with respect to a disclosed aspect or embodiment.

The application is generally directed to increasing transmittance of pixels in an LCD panel. In some embodiments, such an increase may be achieved by including an index-matching passivation layers between two other layers of the panel that have refractive indices different from one another. For instance, one embodiment of an LCD pixel may include various electrode layers, passivation layers, a gate insulation layer, substrate layers, a liquid crystal layer, and the like. Some of these layers have refractive indices different from one another, causing light passing through these layers to be reflected at interfaces between the layers having different refractive indices. By including index-matching layers between other layers having different refractive indices, the total amount of light internally reflected at the layer interfaces is reduced, and transmittance is thereby improved.

Figure 1:
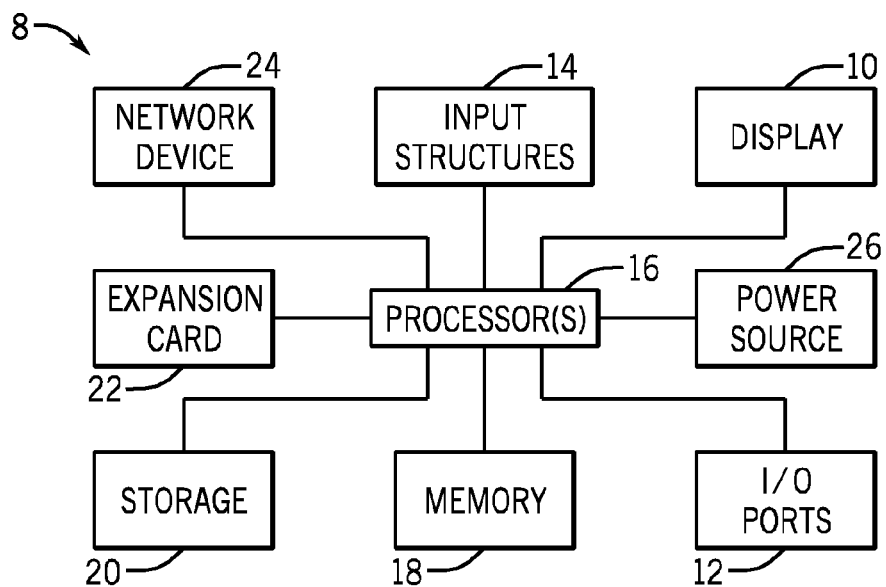
FIG. 1 is a block diagram of exemplary components of an electronic device, in accordance with aspects of the present disclosure.
Figure 3:
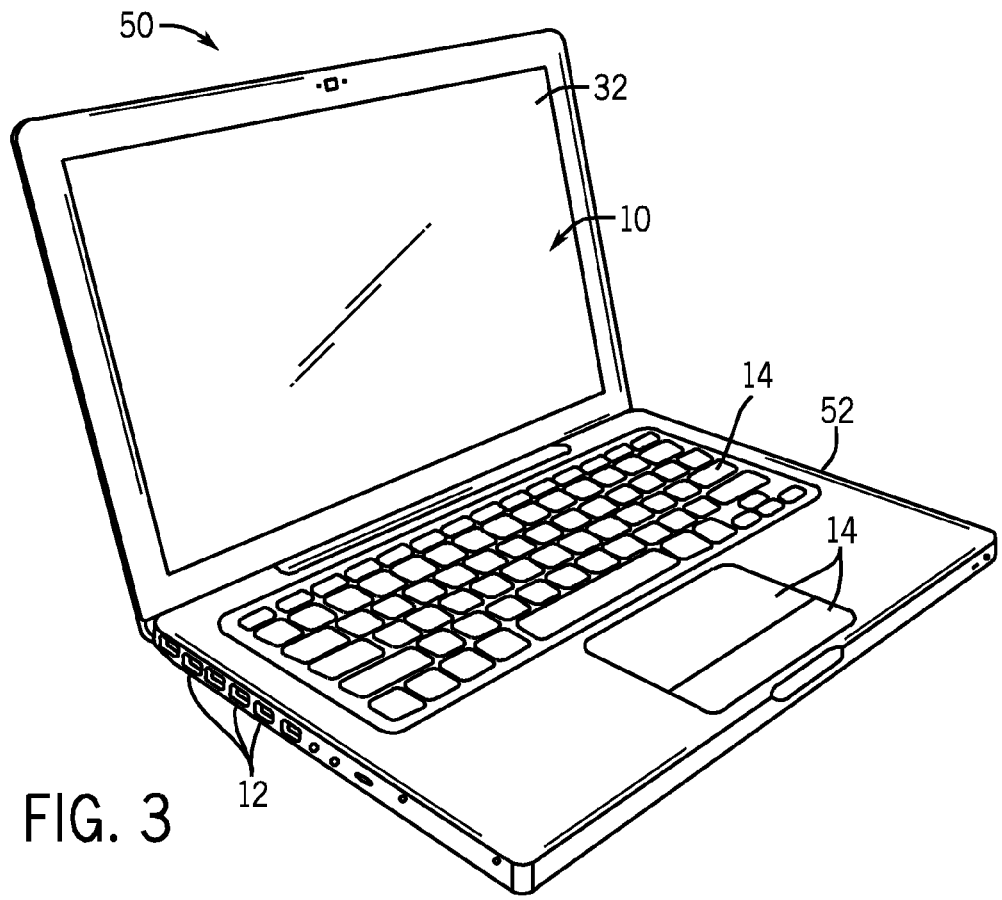
FIG. 3 is a view of a computer in accordance with aspects of the present disclosure.
Figure 2:
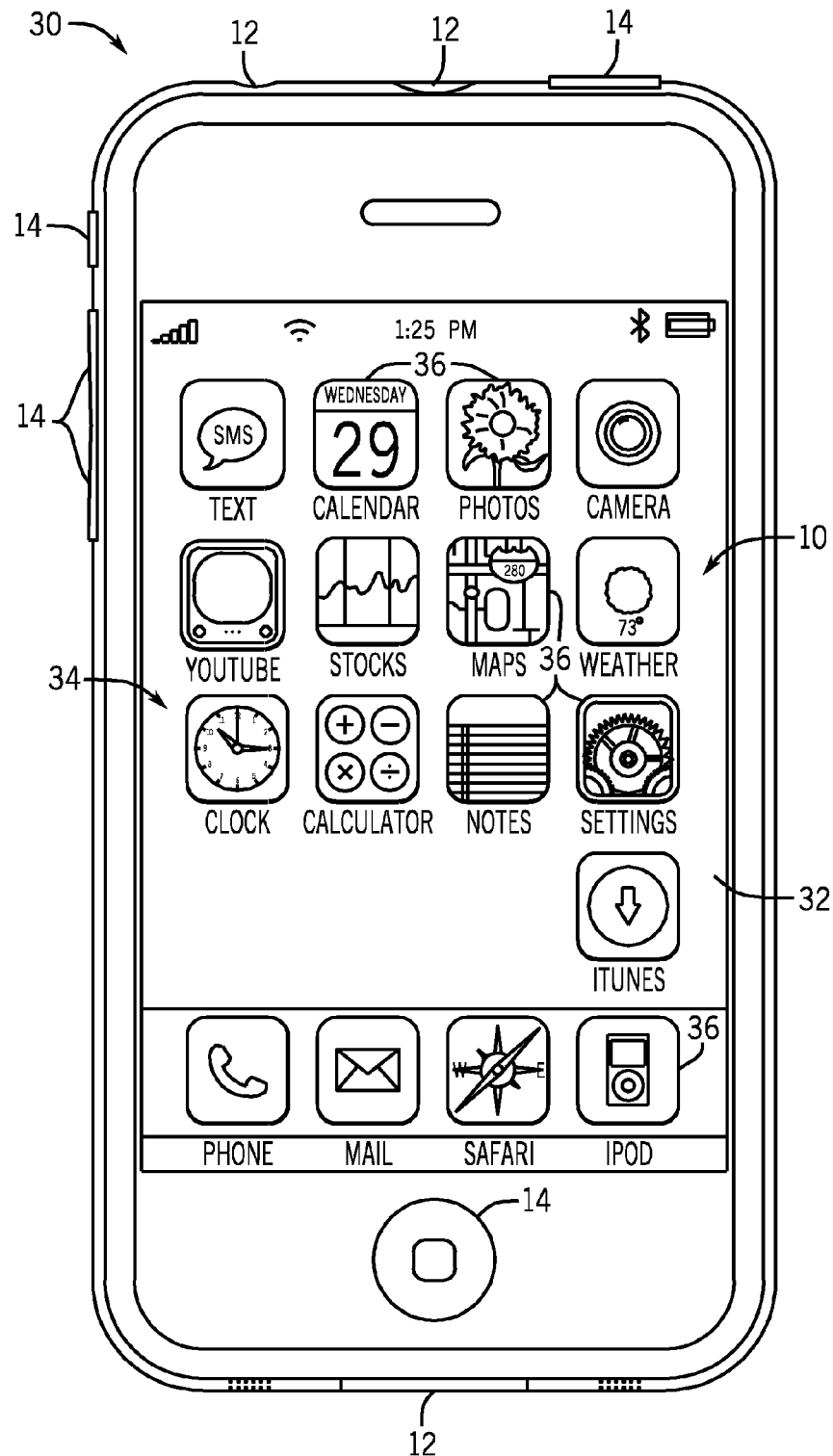
FIG. 2 is a front view of a handheld electronic device in accordance with aspects of the present disclosure.

With these foregoing features in mind, a general description of suitable electronic devices using LCD displays having such increased light transmittance is provided below. In FIG. 1, a block diagram depicting various components that may be present in electronic devices suitable for use with the present techniques is provided. In FIG. 2, one example of a suitable electronic device, here provided as a handheld electronic device, is depicted. In FIG. 3, another example of a suitable electronic device, here provided as a computer system, is depicted. These types of electronic devices, and other electronic devices providing comparable display capabilities, may be used in conjunction with the present techniques.

An example of a suitable electronic device may include various internal and/or external components which contribute to the function of the device. FIG. 1 is a block diagram illustrating the components that may be present in such an electronic device 8 and which may allow the device 8 to function in accordance with the techniques discussed herein. Those of ordinary skill in the art will appreciate that the various functional blocks shown in FIG. 1 may comprise hardware elements (including circuitry), software elements (including computer code stored on a computer-readable medium) or a combination of both hardware and software elements. It should further be noted that FIG. 1 is merely one example of a particular implementation and is merely intended to illustrate the types of components that may be present in a device 8. For example, in the presently illustrated embodiment, these components may include a display 10, I/O ports 12, input structures 14, one or more processors 16, a memory device 18, a non-volatile storage 20, expansion card(s) 22, a networking device 24, and a power source 26.

With regard to each of these components, the display 10 may be used to display various images generated by the device 8. In one embodiment, the display 10 may be a liquid crystal display (LCD). For example, the display 10 may be an LCD employing fringe field switching (FFS), in-plane switching (IPS), or other techniques useful in operating such LCD devices. Additionally, in certain embodiments of the electronic device 8, the display 10 may be provided in conjunction with a touch-sensitive element, such as a touchscreen, that may be used as part of the control interface for the device 8.

The I/O ports 12 may include ports configured to connect to a variety of external devices, such as a power source, headset or headphones, or other electronic devices (such as handheld devices and/or computers, printers, projectors, external displays, modems, docking stations, and so forth). The I/O ports 12 may support any interface type, such as a universal serial bus (USB) port, a video port, a serial connection port, an IEEE-1394 port, an Ethernet or modem port, and/or an AC/DC power connection port.

The input structures 14 may include the various devices, circuitry, and pathways by which user input or feedback is provided to the processor 16. Such input structures 14 may be configured to control a function of the device 8, applications running on the device 8, and/or any interfaces or devices connected to or used by the electronic device 8. For example, the input structures 14 may allow a user to navigate a displayed user interface or application interface. Examples of the input structures 14 may include buttons, sliders, switches, control pads, keys, knobs, scroll wheels, keyboards, mice, touchpads, and so forth.

In certain embodiments, an input structure 14 and display 10 may be provided together, such an in the case of a touch-screen where a touch sensitive mechanism is provided in conjunction with the display 10. In such embodiments, the user may select or interact with displayed interface elements via the touch sensitive mechanism. In this way, the displayed interface may provide interactive functionality, allowing a user to navigate the displayed interface by touching the display 10.

User interaction with the input structures 14, such as to interact with a user or application interface displayed on the display 10, may generate electrical signals indicative of the user input. These input signals may be routed via suitable pathways, such as an input hub or bus, to the processor(s) 16 for further processing.

The processor(s) 16 may provide the processing capability to execute the operating system, programs, user and application interfaces, and any other functions of the electronic device 8. The processor(s) 16 may include one or more microprocessors, such as one or more "general-purpose" microprocessors, one or more special-purpose microprocessors and/or ASICS, or some combination of such processing components. For example, the processor 16 may include one or more reduced instruction set (RISC) processors, as well as graphics processors, video processors, audio processors and/or related chip sets.

The instructions or data to be processed by the processor(s) 16 may be stored in a computer-readable medium, such as a memory 18. Such a memory 18 may be provided as a volatile memory, such as random access memory (RAM), and/or as a non-volatile memory, such as read-only memory (ROM). The memory 18 may store a variety of information and may be used for various purposes. For example, the memory 18 may store firmware for the electronic device 8 (such as a basic input/output instruction or operating system instructions), various programs, applications, or routines executed on the electronic device 8, user interface functions, processor functions, and so forth. In addition, the memory 18 may be used for buffering or caching during operation of the electronic device 8.

The components may further include other forms of computer-readable media, such as a non-volatile storage 20, for persistent storage of data and/or instructions. The non-volatile storage 20 may include flash memory, a hard drive, or any other optical, magnetic, and/or solid-state storage media. The non-volatile storage 20 may be used to store firmware, data files, software, wireless connection information, and any other suitable data.

The embodiment illustrated in FIG. 1 may also include one or more card or expansion slots. The card slots may be configured to receive an expansion card 22 that may be used to add functionality, such as additional memory, I/O functionality, or networking capability, to the electronic device 8. Such an expansion card 22 may connect to the device through any type of suitable connector, and may be accessed internally or external to the housing of the electronic device 8. For example, in one embodiment, the expansion card 22 may be a flash memory card, such as a SecureDigital (SD) card, mini- or microSD, CompactFlash card, Multimedia card (MMC), or the like.

The components depicted in FIG. 1 also include a network device 24, such as a network controller or a network interface card (NIC). In one embodiment, the network device 24 may be a wireless NIC providing wireless connectivity over any 802.11 standard or any other suitable wireless networking standard. The network device 24 may allow the electronic device 8 to communicate over a network, such as a Local Area Network (LAN), Wide Area Network (WAN), or the Internet. Further, the electronic device 8 may connect to and send or receive data with any device on the network, such as portable electronic devices, personal computers, printers, and so forth. Alternatively, in some embodiments, the electronic device 8 may not include a network device 24. In such an embodiment, a NIC may be added as an expansion card 22 to provide similar networking capability as described above.

Further, the components may also include a power source 26. In one embodiment, the power source 26 may be one or more batteries, such as a lithium-ion polymer battery or other type of suitable battery. The battery may be user-removable or may be secured within the housing of the electronic device 8, and may be rechargeable. Additionally, the power source 26 may include AC power, such as provided by an electrical outlet, and the electronic device 8 may be connected to the power source 26 via a power adapter. This power adapter may also be used to recharge one or more batteries if present.

With the foregoing in mind, FIG. 2 illustrates an electronic device 8 in the form of a handheld device 30, here a cellular telephone. It should be noted that while the depicted handheld device 30 is provided in the context of a cellular telephone, other types of handheld devices (such as media players for playing music and/or video, personal data organizers, handheld game platforms, and/or combinations of such devices) may also be suitably provided as the electronic device 8. Further, a suitable handheld device 30 may incorporate the functionality of one or more types of devices, such as a media player, a cellular phone, a gaming platform, a personal data organizer, and so forth.

For example, in the depicted embodiment, the handheld device 30 is in the form of a cellular telephone that may provide various additional functionalities (such as the ability to take pictures, record audio and/or video, listen to music, play games, and so forth). As discussed with respect to the general electronic device of FIG. 1, the handheld device 30 may allow a user to connect to and communicate through the Internet or through other networks, such as local or wide area networks. The handheld electronic device 30, may also communicate with other devices using short-range connections, such as Bluetooth and near field communication. By way of example, the handheld device 30 may be a model of an iPod® or iPhone® available from Apple Inc. of Cupertino, Calif.

In the depicted embodiment, the handheld device 30 includes an enclosure or body that protects the interior components from physical damage and shields them from electromagnetic interference. The enclosure may be formed from any suitable material such as plastic, metal or a composite material and may allow certain frequencies of electromagnetic radiation to pass through to wireless communication circuitry within the handheld device 30 to facilitate wireless communication.

In the depicted embodiment, the enclosure includes user input structures 14 through which a user may interface with the device. Each user input structure 14 may be configured to help control a device function when actuated. For example, in a cellular telephone implementation, one or more of the input structures 14 may be configured to invoke a "home" screen or menu to be displayed, to toggle between a sleep and a wake mode, to silence a ringer for a cell phone application, to increase or decrease a volume output, and so forth.

In the depicted embodiment, the handheld device 30 includes a display 10 in the form of an LCD 32. The LCD 32 may be used to display a graphical user interface (GUI) 34 that allows a user to interact with the handheld device 30. The GUI 34 may include various layers, windows, screens, templates, or other graphical elements that may be displayed in all, or a portion, of the LCD 32. Generally, the GUI 34 may include graphical elements that represent applications and functions of the electronic device. The graphical elements may include icons 36 and other images representing buttons, sliders, menu bars, and the like. The icons 36 may correspond to various applications of the electronic device that may open upon selection of a respective icon 36. Furthermore, selection of an icon 36 may lead to a hierarchical navigation process, such that selection of an icon 36 leads to a screen that includes one or more additional icons or other GUI elements. The icons 36 may be selected via a touchscreen included in the display 10, or may be selected by a user input structure 14, such as a wheel or button.

The handheld electronic device 30 also may include various input and output (I/O) ports 12 that allow connection of the handheld device 30 to external devices. For example, one I/O port 12 may be a port that allows the transmission and reception of data or commands between the handheld electronic device 30 and another electronic device, such as a computer. Such an I/O port 12 may be a proprietary port from Apple Inc. or may be an open standard I/O port.

In addition to handheld devices 30, such as the depicted cellular telephone of FIG. 2, an electronic device 8 may also take the form of a computer or other type of electronic device. Such computers may include computers that are generally portable (such as laptop, notebook, and tablet computers) as well as computers that are generally used in one place (such as conventional desktop computers, workstations and/or servers). In certain embodiments, the electronic device 8 in the form of a computer may be a model of a MacBook®, MacBook® Pro, MacBook Air®, iMac®, Mac® mini, or Mac Pro® available from Apple Inc. By way of example, an electronic device 8 in the form of a laptop computer 50 is illustrated in FIG. 3 in accordance with one embodiment of the present invention. The depicted computer 50 includes a housing 52, a display 10 (such as the depicted LCD 32), input structures 14, and input/output ports 12.

In one embodiment, the input structures 14 (such as a keyboard and/or touchpad) may be used to interact with the computer 50, such as to start, control, or operate a GUI or applications running on the computer 50. For example, a keyboard and/or touchpad may allow a user to navigate a user interface or application interface displayed on the LCD 32.

As depicted, the electronic device 8 in the form of computer 50 may also include various input and output ports 12 to allow connection of additional devices. For example, the computer 50 may include an I/O port 12, such as a USB port or other port, suitable for connecting to another electronic device, a projector, a supplemental display, and so forth. In addition, the computer 50 may include network connectivity, memory, and storage capabilities, as described with respect to FIG. 1. As a result, the computer 50 may store and execute a GUI and other applications.

With the foregoing discussion in mind, it may be appreciated that an electronic device 8 in the form of either a handheld device 30 or a computer 50 may be provided with an LCD 32 as the display 10. Such an LCD 32 may be utilized to display the respective operating system and application interfaces running on the electronic device 8 and/or to display data, images, or other visual outputs associated with an operation of the electronic device 8.

In embodiments in which the electronic device 8 includes an LCD 32, the LCD 32 may include an array or matrix of picture elements (i.e., pixels). In operation, the LCD 32 generally operates to modulate the transmission of light through the pixels by controlling the orientation of liquid crystal disposed at each pixel. In general, the orientation of the liquid crystals is controlled by a varying an electric field associated with each respective pixel, with the liquid crystals being oriented at any given instant by the properties (strength, shape, and so forth) of the electric field.

Different types of LCDs may employ different techniques in manipulating these electrical fields and/or the liquid crystals. For example, certain LCDs employ transverse electric field modes in which the liquid crystals are oriented by applying an in-plane electrical field to a layer of the liquid crystals. Example of such techniques include in-plane switching (IPS) and fringe field switching (FFS) techniques, which differ in the electrode arrangement employed to generate the respective electrical fields.

While control of the orientation of the liquid crystals in such displays may be sufficient to modulate the amount of light emitted by a pixel, color filters may also be associated with the pixels to allow specific colors of light to be emitted by each pixel. For example, in embodiments where the LCD 32 is a color display, each pixel of a group of pixels may correspond to a different primary color. For example, in one embodiment, a group of pixels may include a red pixel, a green pixel, and a blue pixel, each associated with an appropriately colored filter. The intensity of light allowed to pass through each pixel (by modulation of the corresponding liquid crystals), and its combination with the light emitted from other adjacent pixels, determines what color(s) are perceived by a user viewing the display. As the viewable colors are formed from individual color components (e.g., red, green, and blue) provided by the colored pixels, the colored pixels may also be referred to as unit pixels.

Figure 4:
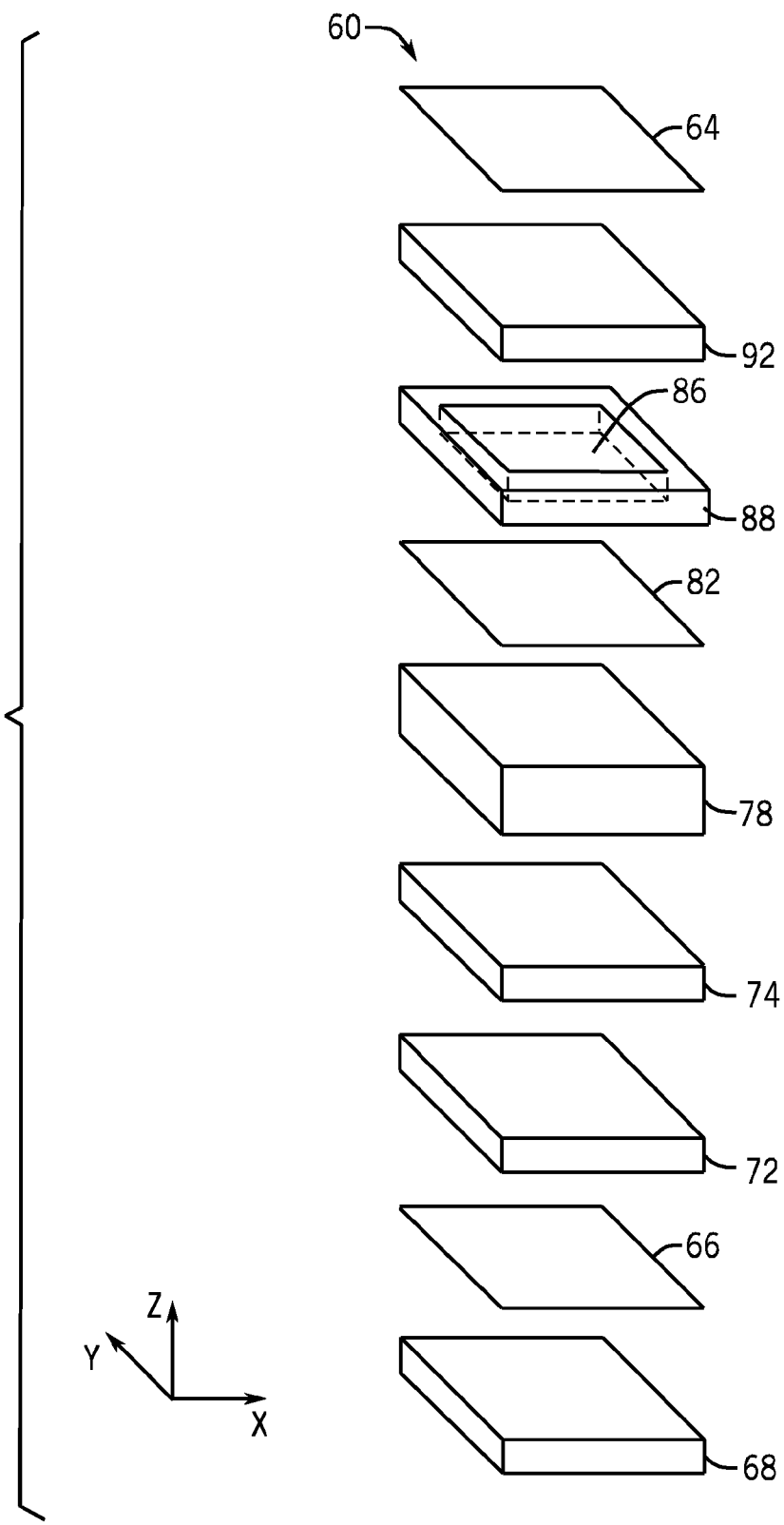
FIG. 4 is an exploded view of exemplary layers of a pixel of an LCD panel, in accordance with aspects of the present disclosure.

With the foregoing in mind, and turning once again to the figures, FIG. 4 depicts an exploded view of different layers of a pixel of an LCD 32. The pixel 60 includes an upper polarizing layer 64 and a lower polarizing layer 66 that polarize light emitted by a backlight assembly 68 or light-reflective surface. A lower substrate 72 is disposed above the polarizing layer 66 and is generally formed from a light-transparent material, such as glass, quartz, and/or plastic.

A thin film transistor (TFT) layer 74 is depicted as being disposed above the lower substrate 72. For simplicity, the TFT layer 74 is depicted as a generalized structure in FIG. 4. In practice, the TFT layer may itself comprise various conductive, non-conductive, and semiconductive layers and structures which generally form the electrical devices and pathways which drive operation of the pixel 60. For example, in an embodiment in which the pixel 60 is part of an FFS LCD panel, the TFT layer 74 may include the respective data lines, scanning or gate lines, pixel electrodes, and common electrodes (as well as other conductive traces and structures) of the pixel 60. Such conductive structures may, in light-transmissive portions of the pixel, be formed using transparent conductive materials, such as indium tin oxide (ITO). In addition, the TFT layer 74 may include insulating layers (such as a gate insulating film) formed from suitable transparent materials (such as silicon oxide) and semiconductive layers formed from suitable semiconductor materials (such as amorphous silicon). In general, the respective conductive structures and traces, insulating structures, and semiconductor structures may be suitably disposed to form the respective pixel and common electrodes, a TFT, and the respective data and scanning lines used to operate the pixel 60, as described in further detail below with regard to FIG. 5. The TFT layer 74 may also include an alignment layer (formed from polyimide or other suitable materials) at the interface with the liquid crystal layer 78.

The liquid crystal layer 78 includes liquid crystal particles or molecules suspended in a fluid or gel matrix. The liquid crystal particles may be oriented or aligned with respect to an electrical field generated by the TFT layer 74. The orientation of the liquid crystal particles in the liquid crystal layer 78 determines the amount of light transmission through the pixel 60. Thus, by modulation of the electrical field applied to the liquid crystal layer 78, the amount of light transmitted though the pixel 60 may be correspondingly modulated.

Disposed on the other side of the liquid crystal layer 78 from the TFT layer 74 may be one or more alignment and/or overcoating layers 82 interfacing between the liquid crystal layer 78 and an overlying color filter 86. The color filter 86, in certain embodiments, may be a red, green, or blue filter, such that each pixel 60 corresponds to a primary color when light is transmitted from the backlight assembly 68 through the liquid crystal layer 78 and the color filter 86.

The color filter 86 may be surrounded by a light-opaque mask or matrix, e.g., a black mask 88 which circumscribes the light-transmissive portion of the pixel 60. For example, in certain embodiments, the black mask 88 may be sized and shaped to define a light-transmissive aperture over the liquid crystal layer 78 and around the color filter 86 and to cover or mask portions of the pixel 60 that do not transmit light, such as the scanning line and data line driving circuitry, the TFT, and the periphery of the pixel 60. In the depicted embodiment, an upper substrate 92 may be disposed between the black mask 88 and color filter 86 and the polarizing layer 64. In such an embodiment, the upper substrate may be formed from light-transmissive glass, quartz, and/or plastic.

Figure 5:
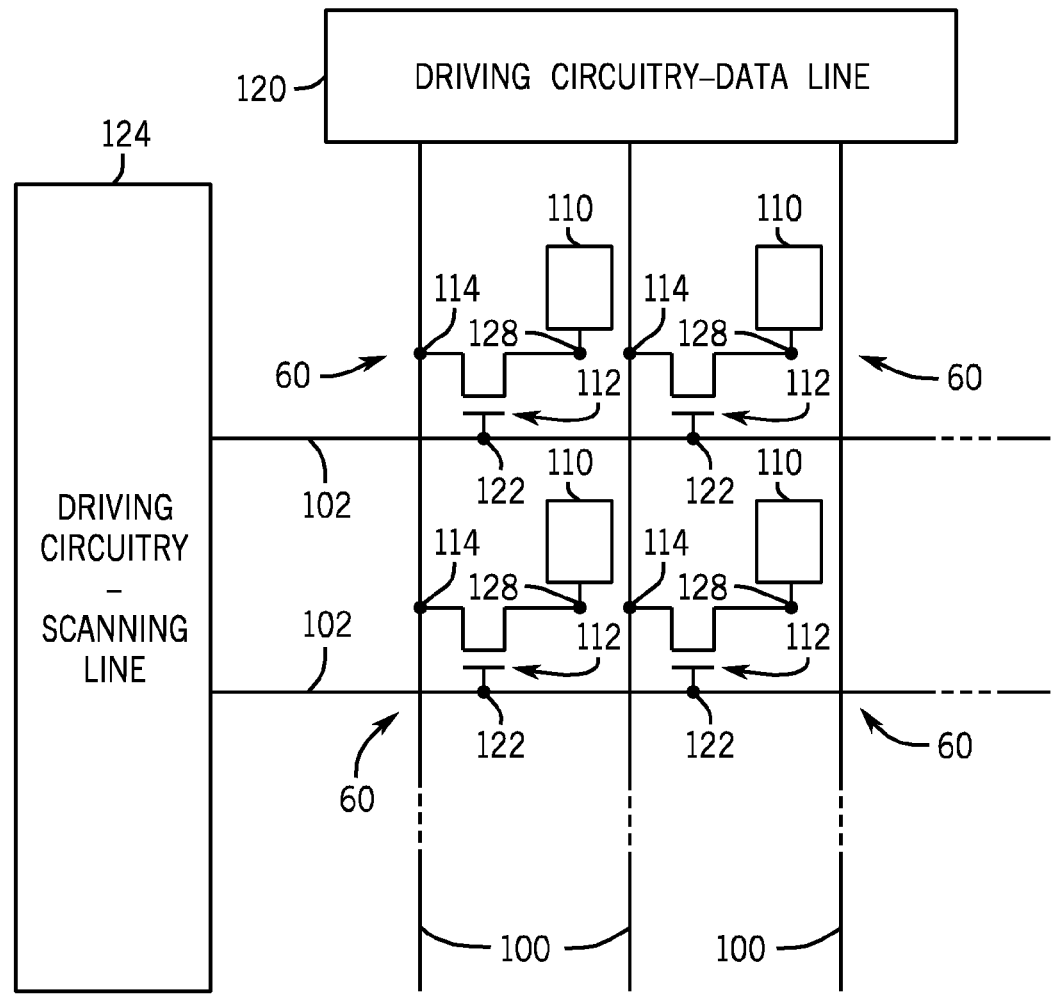
FIG. 5 is a circuit diagram of switching and display circuitry of LCD pixels, in accordance with aspects of the present disclosure.

Referring now to FIG. 5, an example of a circuit view of pixel driving circuitry found in an LCD 32 is provided. For example, such circuitry as depicted in FIG. 5 may be embodied in the TFT layer 74 described with respect to FIG. 4. As depicted, the pixels 60 may be disposed in a matrix that forms an image display region of an LCD 32. In such a matrix, each pixel 60 may be defined by the intersection of data lines 100 and scanning or gate lines 102.

Each pixel 60 includes a pixel electrode 110 and thin film transistor (TFT) 112 for switching the pixel electrode 110. In the depicted embodiment, the source 114 of each TFT 112 is electrically connected to a data line 100, extending from respective data line driving circuitry 120. Similarly, in the depicted embodiment, the gate 122 of each TFT 112 is electrically connected to a scanning or gate line 102, extending from respective scanning line driving circuitry 124. In the depicted embodiment, the pixel electrode 110 is electrically connected to a drain 128 of the respective TFT 112.

In one embodiment, the data line driving circuitry 120 sends image signals to the pixels via the respective data lines 100. Such image signals may be applied by line-sequence, i.e., the data lines 100 may be sequentially activated during operation. The scanning lines 102 may apply scanning signals from the scanning line driving circuitry 124 to the gate 122 of each TFT 112 to which the respective scanning lines 102 connect. Such scanning signals may be applied by line-sequence with a predetermined timing and/or in a pulsed manner.

Each TFT 112 serves as a switching element which may be activated and deactivated (i.e., turned on and off) for a predetermined period based on the respective presence or absence of a scanning signal at the gate 122 of the TFT 112. When activated, a TFT 112 may store the image signals received via a respective data line 100 as a charge in the pixel electrode 110 with a predetermined timing.

The image signals stored at the pixel electrode 110 may be used to generate an electrical field between the respective pixel electrode 110 and a common electrode. Such an electrical field may align liquid crystals within the liquid crystal layer 78 (FIG. 4) to modulate light transmission through the liquid crystal layer 78. In some embodiments, a storage capacitor may also be provided in parallel to the liquid crystal capacitor formed between the pixel electrode 110 and the common electrode to prevent leakage of the stored image signal at the pixel electrode 110. For example, such a storage capacitor may be provided between the drain 128 of the respective TFT 112 and a separate capacitor line.

Various partial cross-sections of pixels of certain LCD panel embodiments are provided in FIGS. 6-12 and discussed in greater detail below. Beginning with FIG. 6, a partial cross-section of a pixel 140 is provided in accordance with one embodiment. Although the pixel 140 is illustrated in accordance with a fringe field switching (FFS) LCD panel, the use of the presently disclosed techniques with other display technologies is also envisaged. As generally described above with reference to FIG. 4, the pixel 140 may include a lower substrate 72 and a control layer, such as a TFT layer 74, disposed over the lower substrate 72 and capable of generating and varying electric fields to control orientation of liquid crystals within the pixel 140.

In the illustrated embodiment, the TFT layer 74 includes a gate insulation layer 142 disposed over and in contact with the lower substrate 72, electrode layers 144 and 146 disposed over the gate insulation layer 142 and the substrate 72, and a passivation layer 148 disposed between the respective electrode layers 144 and 146. The gate insulation layer 142 may be an oxide layer disposed over and in contact with the substrate 72, and both the substrate 72 and the gate insulation layer 142 may, in at least some embodiments, have refractive indices of approximately 1.5. As will be appreciated by those skilled in the art, the gate insulation layer 142 may be disposed over gates 122 of TFTs 112 (FIG. 5) formed on the substrate 72 to insulate the gates 122 from other conductive structures of the TFTs 112.

The electrode layers 144 and 146 may be formed of any suitable material, such as ITO, which may have a refractive index of approximately 1.8. In one embodiment, the electrode layer 144 may be a common electrode shared by multiple pixels of the display panel, and the electrode layer 146 may be a pixel electrode having a number of elongated portions spaced apart from one another within the pixel 140. It is noted, however, that in other embodiments the electrode layer 144 may be a pixel electrode and the electrode layer 146 may be a common electrode. The passivation layer 148 electrically isolates the electrode layers 144 and 146 from one another, and may also be formed of any suitable material. For instance, in some embodiments, the passivation layer 148 is a silicon nitride film, and may have a refractive index of approximately 2.0.

Although in other embodiments the electrode layer 144 may be disposed in contact with the gate insulation layer 142, and the passivation layer 148 may be disposed in contact with either or both of the electrode layers 144 and 146, in the presently illustrated embodiment the pixel 140 includes index-matching layers 150, 152, and 154 that are interposed between these layers. Particularly, such index-matching layers may include intermediate passivation layers provided between other layers of the pixel 140 having different refractive indices, and these index-matching layers may have a refractive index between those of the adjoining layers to reduce internal reflectance within the pixel 140, as described in greater detail below.

Figure 6:
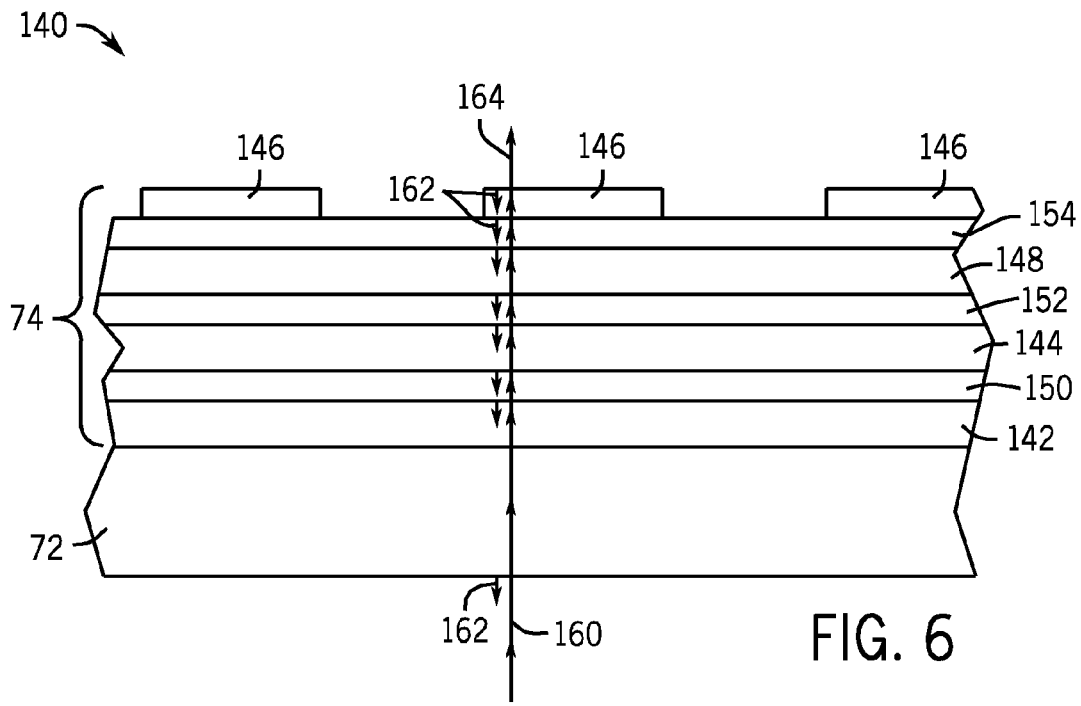
FIG. 6 is a partial cross-section of an LCD pixel in accordance with aspects of the present disclosure.

As generally indicated by reference numeral 160, light incident on the substrate 72 may be transmitted through the various layers of the display stack illustrated in FIG. 6. As this light passes through the various media of the pixel 140, a portion of the light is reflected at each interface between layers having different refractive indices, as generally represented at reference numerals 162. As a result, and as generally represented by reference numeral 164, the amount of light successfully transmitted through all of the layers of the substrate 72 and the TFT layer 74, and into a liquid crystal layer 78 (FIG. 4), is only a portion of the light incident on the lower substrate 72. It will be further appreciated that additional reflective losses may occur at additional interfaces within the pixel 140, such as at interfaces between various other layers described above with respect to FIG. 4.

It is noted that the addition of index-matching layers to the display stack of pixel 140 may generally increase the number of interfaces (and reflections) between materials having different refractive indices. Such index-matching layers, however, reduce the magnitude of reflection at each interface by such a degree that the aggregate amount of light reflected at the upper and lower surfaces of an index-matching layer is less, and in some cases substantially less (e.g., forty-five to approximately fifty percent), than that which would be reflected at a single interface between the layers on opposite sides of the index-matching layer.

Figure 7:
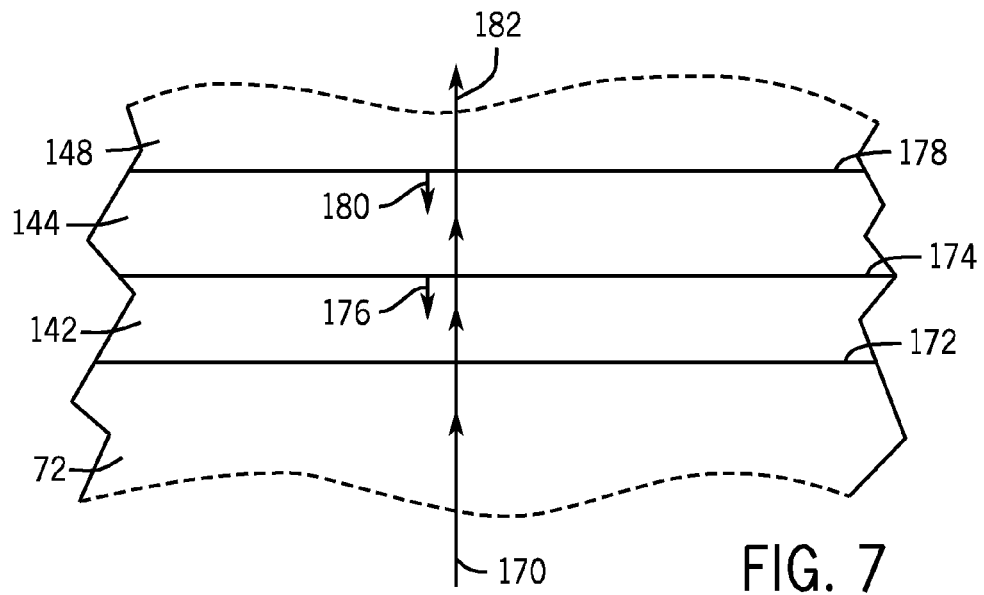
FIG. 7 is a partial cross-section of an LCD pixel in accordance with aspects of the present disclosure.
Figure 8:
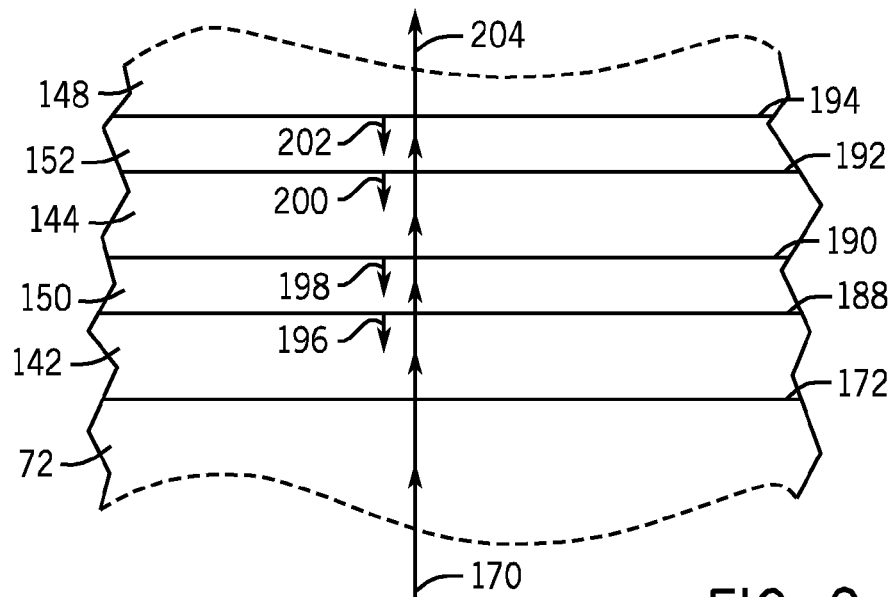
FIG. 8 is another partial cross-section of the LCD pixel of FIG. 6 in accordance with aspects of the present disclosure.

By way of further example, different exemplary arrangements of several layers of the pixel 140 are illustrated in FIGS. 7 and 8. In the embodiment illustrated in FIG. 7, in which index-matching layers are omitted, light 170 passing through the lower substrate 72 propagates through the gate insulation layer 142, the electrode layer 144, and into the passivation layer 148. In the embodiment of FIG. 8, however, index-matching layer 150 is disposed between the gate insulation layer 142 and the electrode layer 144, while index-matching layer 152 is interposed between the electrode layer 144 and the passivation layer 148. Although other layers of the pixel 140 have been omitted for the sake of clarity, it will be appreciated that the light entering the passivation layer 148 may, in turn, pass through a number of other layers, such as those described above, before exiting the pixel 140.

In one embodiment, the substrate 72 and the gate insulation layer 142 may have substantially identical refractive indices of approximately 1.5, the electrode layer 144 may have a refractive index of approximately 1.8, and the passivation layer 148 may have a refractive index of approximately 2.0. For light normal to an interface between materials of different refractive indices, the component of the light that is reflected at such an interface may be generally represented as:

$$R = \left[\frac{n_2 - n_1}{n_2 + n_1}\right]^2 \qquad (1)$$

where R is the ratio of reflected light to incident light, and $n_1$ and $n_2$ are the refractive indices of the materials the light is passing from and into, respectively, at the interface.

In both the embodiments of FIGS. 7 and 8, because the lower substrate 72 and the gate insulation 142 have substantially identical refractive indices, the light 170 traveling through the substrate 72 may pass through an interface 172 between such layers with virtually no reflection. In the embodiment of FIG. 7, the light 170 then passes through the gate insulation 142 to an interface 174 between the gate insulation layer 142 and the electrode layer 144. Given Equation 1 above, and that the refractive indices of the gate insulation layer 142 and the electrode layer 144 are approximately 1.5 and 1.8 respectively, it can be calculated that approximately 0.83 percent of the light normal to the interface 174 will be reflected, as generally indicated by reference numeral 176, with the remaining light passing into the electrode layer 144.

In turn, as the light reaches interface 178 between the electrode layer 144 (n~1.8) and the passivation layer 148 (n~2.0), approximately 0.28 percent of the light normal to the interface 178 will be reflected back into the electrode layer 144, as generally represented by reference numeral 180, rather than transmitted into the passivation layer 148. Thus, the total amount of light passing into the passivation layer 148, generally represented by reference numeral 182, may be approximately 1.1 percent less than the amount of light 170 that entered the substrate 72. While the amount of light reflected at any one interface may be relatively small, it will be appreciated that the aggregate transmittance losses due to internal reflectance between the many layers of the pixel 140 may noticeably reduce the brightness of the pixel 140.

In sharp contrast, the index-matching layers 150 and 152 in FIG. 8 may reduce the reflective losses resulting from the passage of light from the substrate 72 into the passivation layer 148. In various embodiments, the refractive index of the index-matching layer 150 is greater than the refractive index of approximately 1.5 of the gate insulation layer 142, and is less than the refractive index of approximately 1.8 of the electrode layer 144. In one embodiment, the index-matching layer 150, as well as any or all other index-matching layers, may have a refractive index that is approximately the square root of the product of the refractive indices of the layers on opposing sides of the index-matching layer. Consequently, in one embodiment, the index-matching layer 150 may have a refractive index of approximately 1.64 (i.e., approximately the square root of the product of 1.5 and 1.8). The index-matching layer 150 may be formed of any suitable material, such as that available from JSR Corporation of Tokyo, Japan, as product number KZ6676.

In this embodiment, the index-matching layer 150 may form interfaces 188 and 190 along the gate insulation layer 142 and the electrode layer 144, respectively. Given Equation 1 above, it can be calculated that approximately 0.21 percent of the light passing through the gate insulation layer 142 along the normal of the interface 188 may be reflected at the interface 188 (generally indicated by reference numeral 196), and approximately 0.21 percent of the light passing similarly through the interface 190 may also be reflected (generally indicated by reference numeral 198).

Further, in an embodiment in which the passivation layer 148 has a refractive index of approximately 2.0, the index-matching layer 152 may have a refractive index of approximately 1.90, which is approximately the square root of the product of the refractive indices of the electrode layer 144 and the passivation layer 148. In this embodiment, the reflective losses of light normal to the interfaces 192 and 194 may be calculated to be approximately 0.07 percent each, and are generally indicated by reference numerals 200 and 202. Consequently, the amount of reflective losses from propagation of light from the substrate 72 into the passivation layer 148 in the embodiment of FIG. 8 is only approximately 0.56 percent, leading to a greater amount of light 204 reaching the passivation layer 148 when compared to the embodiment of FIG. 7. It may be observed that although the embodiment of FIG. 8 includes a greater number of interfaces from which light is reflected, the aggregate reflective losses through the illustrated layers of FIG. 8 are only approximately half that of the corresponding layers in FIG. 7.

Figure 9:
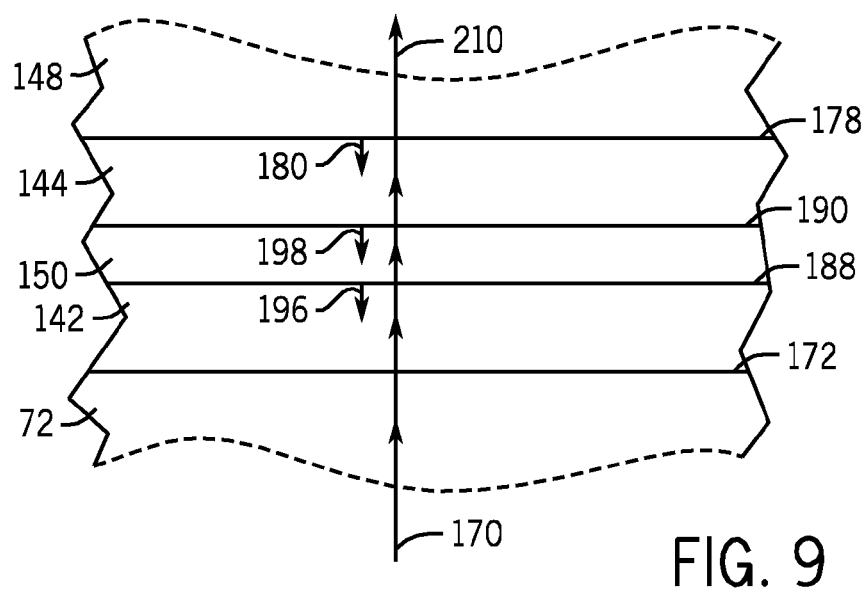
FIG. 9 is a partial cross-section of another LCD pixel embodiment in accordance with aspects of the present disclosure.

Although FIG. 8 depicts two index-matching layers disposed between three other layers having different refractive indices, it will be appreciated that various index-matching layers may be added or omitted as desired in other embodiments. For example, as illustrated in FIG. 9, the index-matching layer 152 between the electrode layer 144 and the passivation layer 148 may be omitted. In this example, light 170 would be reflected at the sequential interfaces 188, 190, and 178 by the amounts generally discussed above with respect to FIGS. 7 and 8, resulting in an amount of light 210 reaching the passivation layer 148.

Although each index-matching layer 150, 152, and 154 is illustrated as a single layer for explanatory purposes, it is noted that these index-matching layers, as well as other such layers, may be provided as a plurality of index-matching layers. For example, the index-matching layer 150 could be provided as two or more index-matching layers having different refractive indices than both each other and the adjoining layers. In one embodiment, multiple contiguous index-matching layers may have refractive indices such that the refractive index of each layer is the square root of the product of the refractive indices of the adjoining layers.

Figure 10:
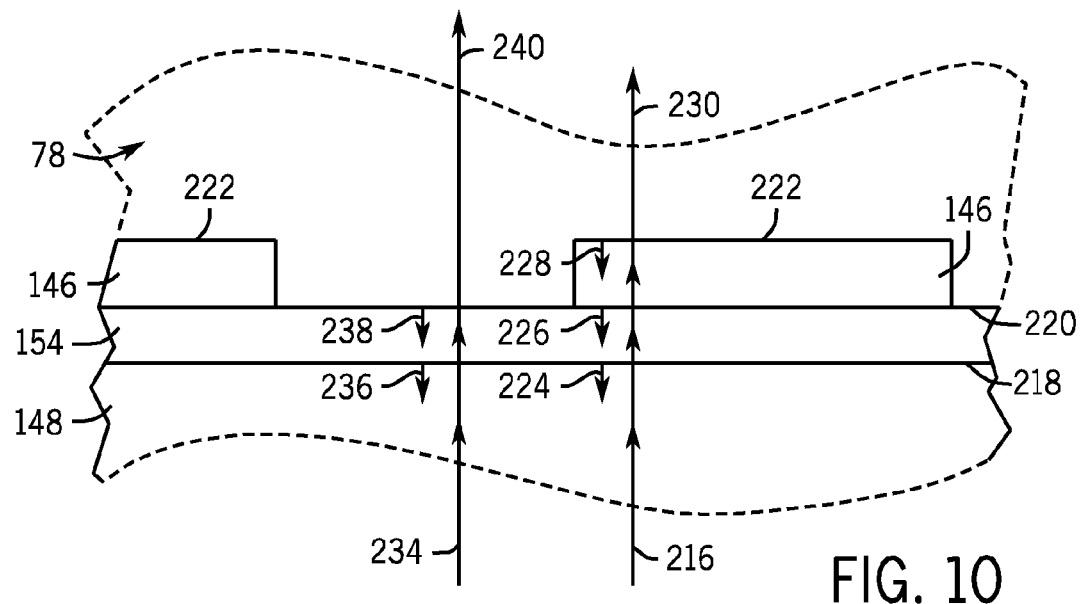
FIG. 10 is another partial cross-section of the LCD pixel of FIG. 6 in accordance with aspects of the present disclosure.

The passage of light through the passivation layer 148 and the electrode layer 146 of one embodiment of the pixel 140 is generally depicted in FIG. 10. In the presently illustrated embodiment, light 216 transmitted through the passivation layer 148 may pass through the index-matching layer 154 and the electrode layer 146 before reaching the liquid crystal layer 78. As noted above, in some embodiments the passivation layer 148 may have a refractive index of approximately 2.0. Additionally, in one embodiment the electrode layer 146 and the liquid crystal layer 78 may have refractive indices of approximately 1.8 and 1.5, respectively. As the light 216 passes through the layers illustrated in FIG. 10, light may be reflected at interfaces 218, 220, and 222 as a result of the differences in refractive indices of the materials of the layers (as generally represented by reference numerals 224, 226, and 228, respectively), and a remaining portion of light 230 may pass into the liquid crystal layer 78. In one embodiment, the index-matching layer may have a refractive index between those of the passivation layer 148 and the electrode layer 146, such as approximately 1.90 (i.e., approximately the square root of the product of the refractive indices of the passivation layer 148 and the electrode layer 146). In another embodiment, an additional index-matching layer may be provided between the electrode layer 146 and the liquid crystal layer 78 to reduce reflectance of light passing between these layers.

It is noted, however, that in some embodiments of an IPS or FFS LCD panel a series of electrode portions (e.g., the electrode layer 146) may be separated from one another along a surface of the index-matching layer 154, such that the index-matching layer 154 contacts the electrode layer 146 only along portions of the interface 220, while other portions of the index-matching layer 154 may contact the liquid crystal layer 78. Light 234 passing from the passivation layer 148 may generally propagate through the index-matching layer 154 and into the liquid crystal layer 78, without passing through the electrode layer 146. In such an embodiment, reflective losses for light 234 passing from the passivation layer 148 into the liquid crystal layer 78 may occur only at interfaces 218 and 220, as generally indicated by reference numerals 236 and 238, and the remaining light may pass into the liquid crystal layer 78, as generally represented by reference numeral 240.

Accordingly, in other embodiments, the index-matching layer 154 may have a refractive index between those of the passivation layer 148 and the liquid crystal layer 78, and less than that of the electrode layer 146. For example, in one embodiment, the index-matching layer 154 may have a refractive index of approximately 1.74 (i.e., approximately equal to the square root of the product of 1.5 and 2.0). As with the other index-matching layers described herein, the index-matching layer 154 may be formed of any suitable material, such as that available from JSR Corporation of Tokyo, Japan, as product number TT8038.

Figure 11:
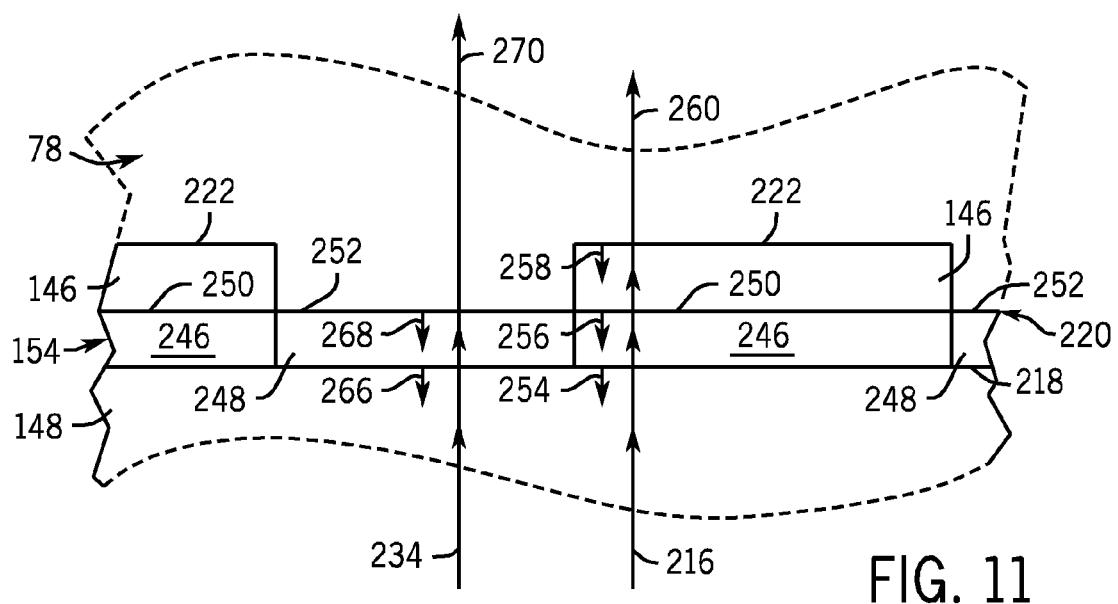
FIG. 11 is a partial cross-section of an additional LCD pixel in accordance with aspects of the present disclosure.

In another embodiment, the index-matching layer 154 may include multiple regions having different refractive indices, as generally depicted in FIG. 11. In this presently illustrated embodiment, portions 246 of the index-matching layer 154 having a first refractive index may be provided at regions directly between the passivation layer 148 and the electrode layer 146. Additional portions 248 of the index-matching layer 154 having a second refractive index may be provided at positions directly between the passivation layer 148 and the liquid crystal layer 78. In such an embodiment, the different refractive indices of the portions 246 and 248 may be independently selected to reduce reflectance across the relevant layers. For example, in one embodiment, the portions 246 may have a refractive index of approximately 1.90, while the portions 248 may have a refractive index of approximately 1.74.

As light 216 generally propagates from the passivation layer 148, some of the light is reflected at the interface 218, at a region 250 of the interface 220 between the portion 246 of the index-matching layer 154 and the electrode layer 146, and at the interface 222. These reflective losses are generally indicated as reference numerals 254, 256, and 258, respectively, and a remaining portion 260 of light passes into the liquid crystal layer 78. Additional light 234 may pass through the passivation layer 148, a portion 248 of the index-matching layer 154, and into the liquid crystal layer 78. The light 234 is partially reflected at interface 218 and a region 252 of the interface 220, as generally represented by reference numerals 266 and 268, and the remaining light passes through the liquid crystal layer 78, as generally indicated by reference numeral 270.

Figure 12:
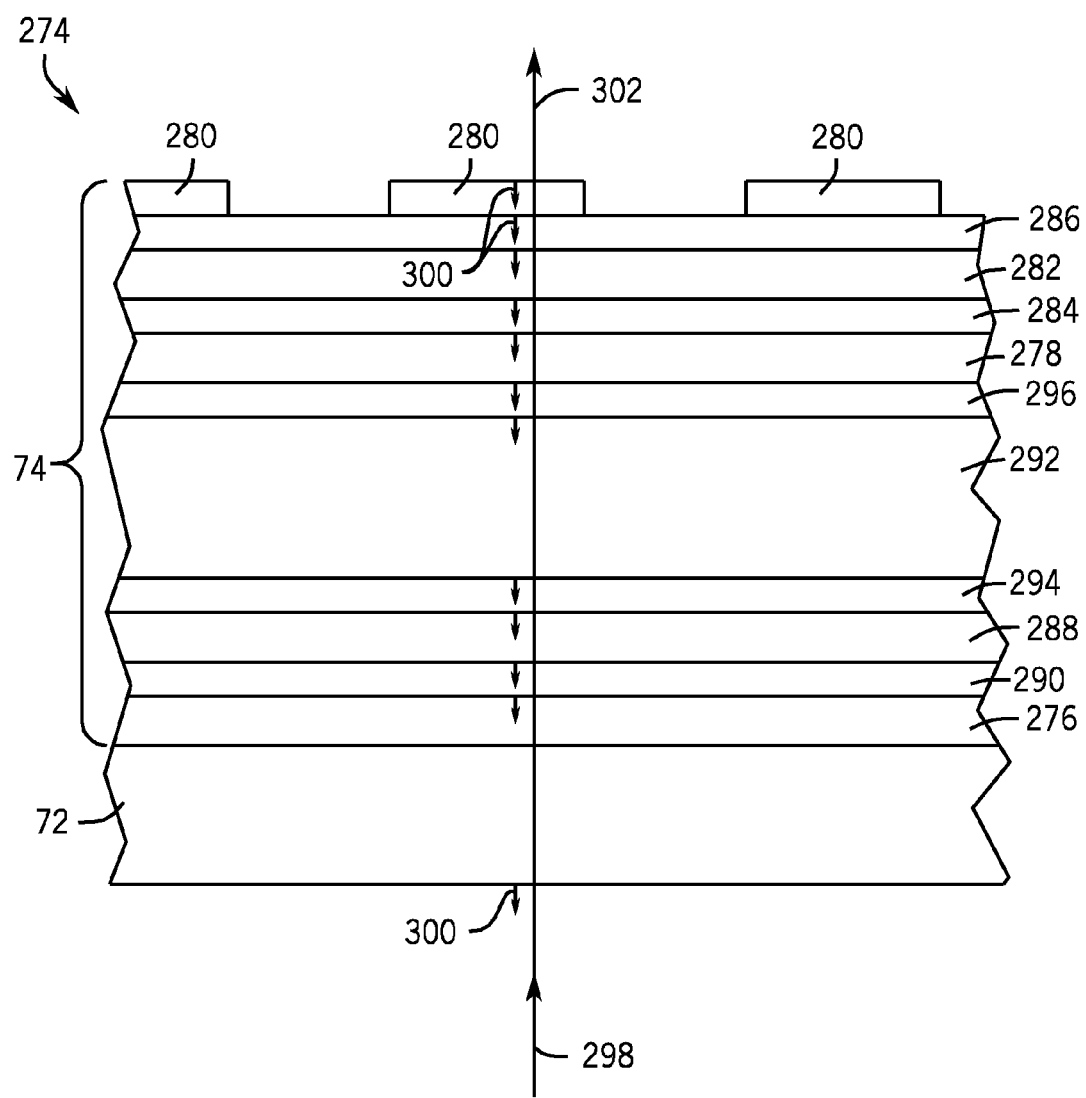
FIG. 12 is a partial cross-section of another embodiment of an LCD pixel in accordance with aspects of the present disclosure.

Although certain layers of display pixels have been described above, it is noted that pixels and displays of other embodiments may include fewer layers, and may include more layers in addition to, or in place of, those described above. For example, an embodiment of a pixel 274 having a greater number of layers than the pixel 140 is generally illustrated in FIG. 12 in full accordance with the present techniques. The pixel 274 may include a lower substrate 72 and a TFT layer 74. As noted above, the lower substrate 72 may be a transparent material, such as glass, and may have a refractive index of approximately 1.5.

The TFT layer 74, in turn, may include a gate insulation layer 276, and electrode layers 278 and 280 generally disposed about a passivation layer 282. As in the examples described above, the gate insulation layer 276 may include an oxide layer having a refractive index substantially similar to that of the lower substrate 72, such as approximately 1.5, although other gate insulation layers 276 having different refractive indices may also be used. The electrode layers 278 and 280 may be formed of any suitable material, such as ITO having a refractive index of approximately 1.8. The passivation layer 282 may, in one embodiment, include a silicon nitride film having a refractive index of approximately 2.0. Index-matching layers 284 and 286 may be disposed between the passivation layer 282 and the respective electrode layers 280 and 282. Additional layers may include a passivation layer 288, which in one embodiment may be formed of a silicon nitride film with a refractive index of approximately 2.0, and an organic passivation layer 292 having a refractive index of approximately 1.5. Further index-matching layers 290, 294, and 296 may also be provided as generally illustrated in FIG. 12.

In some embodiments, any or all of the various index-matching layers of the pixel 274 may have a refractive index between those of layers in contact with opposite sides of the respective index-matching layer. In such an embodiment, light 298 passing through the various layers may be reflected (as generally indicated by reference numeral 300) by a reduced amount, and a remaining amount of light 302 may pass into the liquid crystal layer 78 above the TFT layer 74. As generally noted previously, the index-matching layers of one embodiment may be formed of materials having refractive indices approximately equal to the square root of the product of the refractive indices of the layers in contact with opposite sides of the respective index-matching layer to further reduce reflective losses through the TFT layer 74.

While the preceding examples describe configurations of pixels for use in a FFS LCD device, it should be understood that these examples are not intended to be limiting in scope and, indeed, the present teachings may also be applicable to other types of LCDs or display panels, such as IPS LCDs or others. More generally, while the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:
1. An electronic device, comprising:
one or more input structures;
a storage structure encoding one or more executable routines;
a processor capable of receiving inputs from the one or more input structures and of executing the one or more executable routines when loaded in a memory; and
a liquid crystal display (LCD) capable of displaying an output of the processor, wherein the LCD includes:

a first passivation layer disposed in contact with a second passivation layer, wherein the first passivation layer includes a refractive index less than that of the second passivation layer;

a plurality of electrodes formed on a common surface of the first passivation layer; and a liquid crystal layer disposed over the plurality of electrodes, wherein the electrodes of the plurality of electrodes are spaced apart along the common surface such that portions of the liquid crystal layer are disposed between the electrodes and the first passivation layer, wherein the first passivation layer includes a plurality of regions having different refractive indices, wherein the plurality of regions includes a first region in contact with an electrode of the plurality of electrodes and a second region in contact with the liquid crystal layer, wherein the first region of the first passivation layer has a refractive index between those of the second passivation layer and the electrode, while the second region of the first passivation level has a refractive index between those of the second passivation layer and the liquid crystal layer.

2. The electronic device of claim 1, wherein the first region of the first passivation layer has a refractive index of approximately 1.9.

3. The electronic device of claim 1, wherein the second region of the first passivation layer has a refractive index of approximately 1.74.

4. The electronic device of claim 1, wherein the liquid crystal layer has a refractive index of approximately 1.5.

5. The electronic device of claim 1, wherein the electrode has a refractive index of approximately 1.8.

6. The electronic device of claim 1, wherein the second passivation layer has a refractive index of approximately 2.0.

7. The electronic device of claim 1, wherein the LCD comprises a fringe field switching LCD panel.

8. A liquid crystal display, comprising:
a first passivation layer disposed in contact with a second passivation layer, wherein the first passivation layer includes a refractive index less than that of the second passivation layer;

a plurality of electrodes formed on a common surface of the first passivation layer; and a liquid crystal layer disposed over the plurality of electrodes, wherein the electrodes of the plurality of electrodes are spaced apart along the common surface such that portions of the liquid crystal layer are disposed between the electrodes and the first passivation layer, wherein the first passivation layer includes a plurality of regions having different refractive indices, wherein the plurality of regions includes a first region in contact with an electrode of the plurality of electrodes and a second region in contact with the liquid crystal layer, wherein the first region of the first passivation layer has a refractive index between those of the second passivation layer and the electrode, while the second region of the first passivation level has a refractive index between those of the second passivation layer and the liquid crystal layer.

9. The liquid crystal display of claim 8, wherein the first region of the first passivation layer has a refractive index of approximately 1.9.

10. The liquid crystal display of claim 8, wherein the second region of the first passivation layer has a refractive index of approximately 1.74.

11. The liquid crystal display of claim 8, wherein the liquid crystal layer has a refractive index of approximately 1.5.

12. The liquid crystal display of claim 8, wherein the electrode has a refractive index of approximately 1.8.

13. The liquid crystal display of claim 8, wherein the second passivation layer has a refractive index of approximately 2.0.

14. The liquid crystal display of claim 8, wherein the liquid crystal display comprises a fringe field switching liquid crystal display panel.

* * * * *